United States Patent [19]

Insolio

[11] 4,105,150
[45] Aug. 8, 1978

[54] GLASS TUBE CUTTING MACHINE

[75] Inventor: Thomas A. Insolio, Bristol, Conn.

[73] Assignee: The Fletcher-Terry Company, Farmington, Conn.

[21] Appl. No.: 797,002

[22] Filed: May 16, 1977

[51] Int. Cl.² ............................................. C03B 33/06
[52] U.S. Cl. ....................................... 225/96.5; 83/92; 214/6 H
[58] Field of Search ...................... 225/96.5, 2; 83/92, 83/94, 96, 614, 487, 488, 455; 214/6 H, 3.1

[56] References Cited

U.S. PATENT DOCUMENTS

| | | | |
|---|---|---|---|
| 1,340,219 | 5/1920 | Folk | 83/92 |
| 2,304,926 | 12/1942 | Juvinall | 225/2 |
| 3,320,842 | 5/1967 | Bailey et al. | 83/96 X |
| 3,718,268 | 2/1973 | Insolio | 225/96.5 X |
| 3,831,472 | 8/1974 | Sasaki | 83/92 |
| 3,865,288 | 2/1975 | Hunsinger et al. | 225/96.5 |
| 3,926,081 | 12/1975 | Roberts | 83/96 |
| 3,955,689 | 5/1976 | Wallace | 83/92 X |

*Primary Examiner*—Frank T. Yost
*Attorney, Agent, or Firm*—McCormick, Paulding & Huber

[57] ABSTRACT

Glass tubes to be cut are placed side-by-side on an inclined bed which has an anvil at one end, and a movable measuring bar or stop spaced downstream of the anvil to define the tube length desired. The tubes are adapted to slide downwardly on the inclined bed to engage the stop, and can be clamped to the bed so that a glass scoring tool and break off shoe, provided in a movable carriage, can score and break the tubes over the anvil after the stop has been retracted. Superstructure above the bed includes a continuously driven shaft together with parallel guide rods for the carriage. Selectively casterable wheels in the carriage engage the continuously driven shaft to move it in one, and an opposite direction, and the carriage includes means for retracting the scoring tool and break off shoe for the return movement of the carriage. A magazine is provided below the group of cut tube segments, and has a floor which is indexed downwardly in response to completion of each cutting pass by the carriage. The magazine is itself movable on tracks to clear the retractable stop as the latter returns to its active position for measuring the next group of tubes to be cut.

12 Claims, 8 Drawing Figures

GLASS TUBE CUTTING MACHINE

BACKGROUND OF THE INVENTION

This invention relates generally to machines for feeding, scoring and breaking relatively small diameter glass tubing, and deals more particularly with an improvement to the machine disclosed in my prior U.S. Pat. No. 3,718,268 entitled "Machine For Feeding, Scoring and Breaking Small Diameter Glass Tubing" issued Feb. 27, 1973. The machine described in said patent includes a horizontal bed for receiving the length of tubing in side-by-side relationship, and an anvil is provided at the downstream end of the bed, with a carriage being adapted to traverse the bed above the anvil to pass a scoring wheel and break off shoe across the tubes. The said patent also discloses control circuitry for providing for an automatic mode of operation for the carriage and discloses means for feeding the tubes between each pass of the carriage.

This invention relates to an improvement to the above described machine wherein the feeding means is replaced by means for inclining the bed so that gravity can be taken advantage of to feed the tubes downwardly against a measuring bar or stop. This disclosure further includes improved means for handling the severed tube segments, and also improved means for achieving the traversing movement of the carriage, and other features to be described hereinbelow.

SUMMARY OF THE INVENTION

The machine disclosed herein provides for efficiently handling relatively long lengths of glass tubing or the like, and also to the more efficient handling of the segments of such tubes produced by the machine. A bed is provided in a fixed frame for supporting the elongated tubes in side-by-side relationship, and the bed is adapted to be inclined so as to feed the glass tubes downwardly, across an anvil associated with one end of the bed, against stop means being provided in spaced relationship to the anvil to measure the segment lengths which are desired. Means is provided for clamping the tubes to the inclined bed and for retracting the measuring bar or stop means so that an improved magazine can be moved into position below the ends of the tubes to be cut for receiving the same in a very efficient manner.

A further feature of the present invention relates to the means for achieving traversing movement of the scoring tool and break off shoe, a carriage for these components being provided on fixed ways in a superstructure located above the inclined bed. A continuously driven shaft is provided in the superstructure, and continuously drives a pair of casterable rollers or wheels. That is, these rollers or casters can be selectively inclined in one and an opposite direction to achieve forward and return movement of the carriage.

A still further feature of the present invention relates to the configuration of the magazine wherein a downwardly indexable floor is adapted to receive the cut segments of tubing after they have been severed so that these segments drop no more than one diameter of such tubing, and preferably somewhat less than one diameter thereof. The magazine is itself movable between an active and inactive positions to clear the measuring bar.

DETAILED DESCRIPTION

Figure 1:
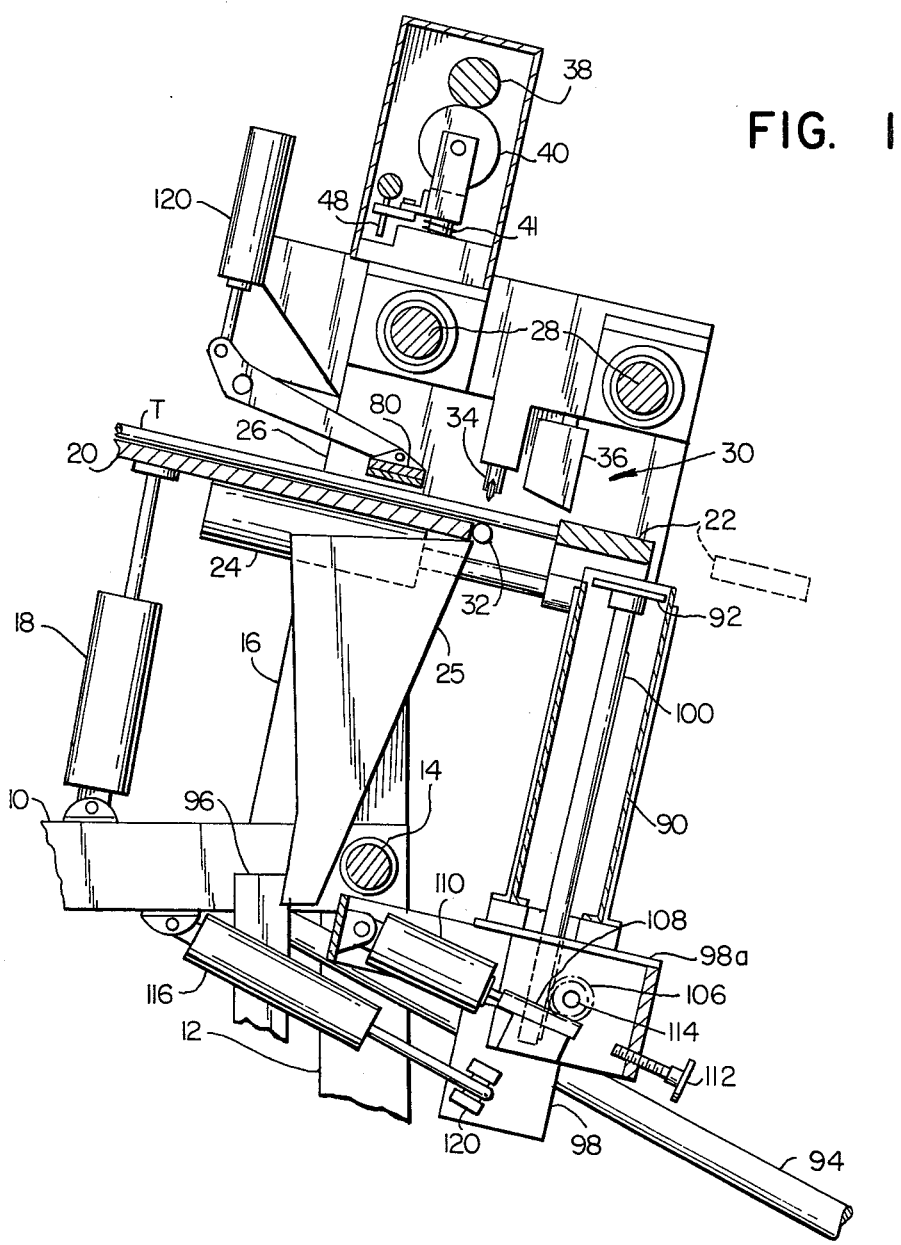
FIG. 1 is a vertical sectional view of a machine for feeding, scoring and breaking small diameter glass tubing and for efficiently receiving the cut segments in an improved magazine constructed in accordance with the present invention.
Figure 2:
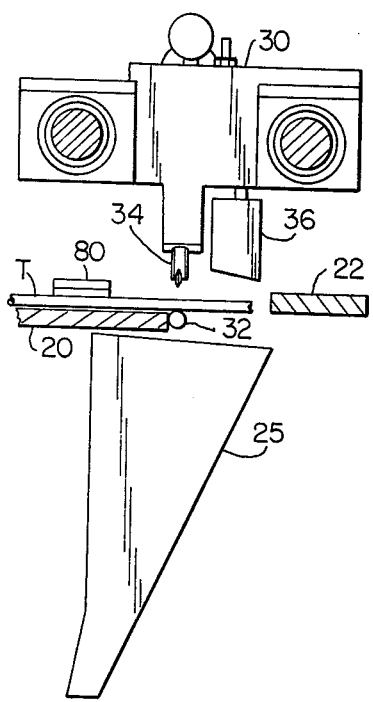
FIG. 2 is a view similar to FIG. 1 with certain components having been eliminated, and with the bed oriented in its horizontal position in order to permit easy loading of the bed with the elongated members to be cut.
Figure 3:
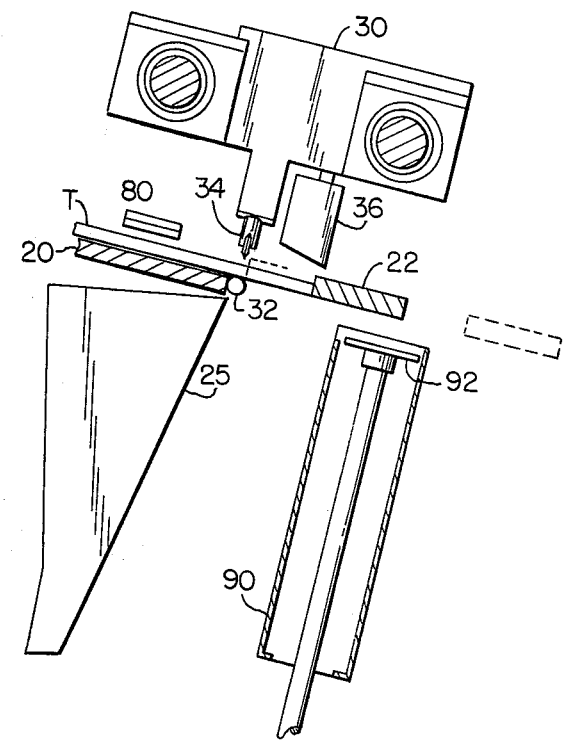
FIG. 3 is a view similar to FIG. 2, but showing the bed in its inclined position, and with the measuring bar or stop engaging the lower ends of such tubing so as to position the tubing for a cutting pass of the carriage.

Turning now to the drawings in greater detail, a fixed frame 10 is provided with legs or the like 12 for pivotally supporting a superstructure on a fixed rockshaft 14 provided in the machine frame as illustrated in FIG. 1. The superstructure comprises laterally spaced uprights 16, which are journalled on the rockshaft 14 to support the inclined bed 20 so that the bed can be moved between the inclined position shown in FIG. 1 and a horizontal position illustrated in FIG. 2 by actuator means 18.

The bed 20 has a lateral extent such that a plurality of glass tubes T, T can be accommodated thereon in side-by-side relationship to one another and edge guides (not shown) are preferably provided for restraining the tubes T, T against movement in the lateral direction once the bed 20 has been loaded as shown in FIG. 1. Thus, the bed 20 is generally similar to that described in my previous patent except for the fact that the bed 20 disclosed in this application is provided in a superstructure which can be moved between a horizontal and an inclined position relative to the fixed frame of the machine 10. In its inclined position the tubes T, T are adapted to slide downwardly against a stop or measuring bar 22 which bar is itself movable between the broken and solid line positions shown for it in FIG. 1 by means of an air cylinder 24 mounted to the underside of the bed 20. The supports 16 not only support the bed 20, but also support end plates 26 which together with the supports 16 comprise a superstructure pivotally mounted to the machine frame on the rockshaft 14.

These end plates 26, 26 support laterally extending guide rods 28, 28 upon which a carriage structure, indicated generally at 30, is slidably received for movement across the bed in a transverse or lateral direction with respect to the longitudinal axes of the glass tubes T. The carriage structure 30 is similar in many respects to that disclosed in my prior issued U.S. Pat. No. 3,718,268, and includes a glass scoring tool or wheel together with an associated break off shoe such that these components can be moved across the bed above an anvil 32 in order to score and break the glass tubes in the manner described in said issued U.S. patent. The glass scoring tool preferably comprises a scoring wheel mounted in a pillar post and illustrated in FIG. 1 at 34, with the break off shoe adapted to trail the scoring wheel as best shown in FIG. 6 in order to achieve the desired scoring and breaking functions on a single pass of the carriage as disclosed in said issued U.S. patent.

Figure 6:
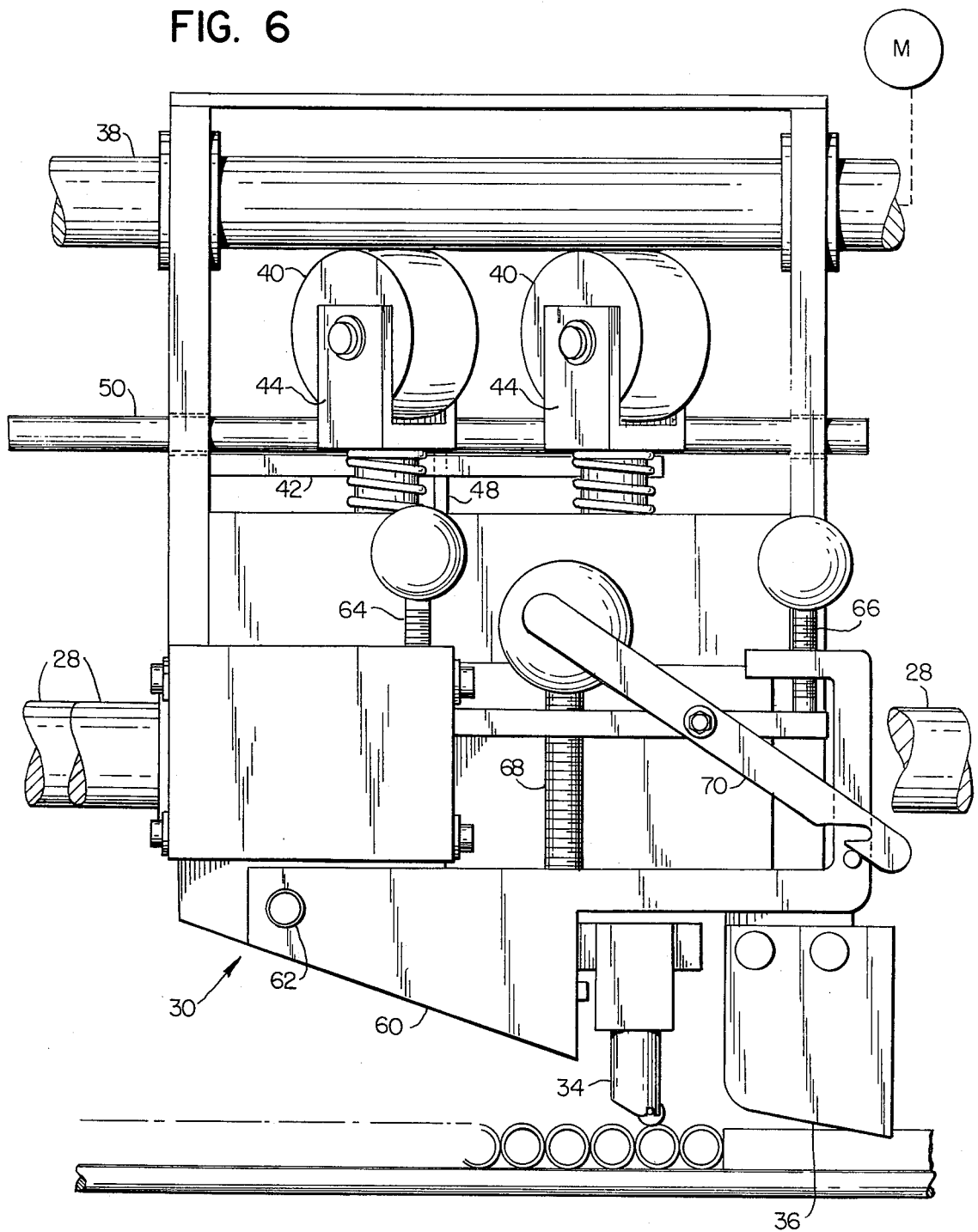
FIG. 6 is an enlarged front view of the carriage shown schematically in FIGS. 1-5 inclusively.

The carriage of FIG. 6 differs from that illustrated in my previous patent insofar as the means for achieving movement of the carriage on the guide rods 28, 28 is provided for from a continuously driven unidirectional shaft 38 driven by a motor M in one direction only. The means for accomplishing movement of the carriage in one and an opposite direction from the shaft 38 comprises a pair of frictionally driven castered wheels 40, 40 which wheels are adapted to be continuously driven by the shaft 38 in a direction dictated by the direction of rotation of the shaft 38, but which wheels are adapted to be castered from the position shown wherein the carriage is movable in one direction, to an opposite castered position wherein the carriage is adapted to be driven in the opposite relative direction. Means is also provided for achieving a stationary position for the carriage, and this is achieved by causing the castered wheels 40, 40 to be oriented perpendicularly to the axis of rotation of the drive shaft 38.

Figure 7:
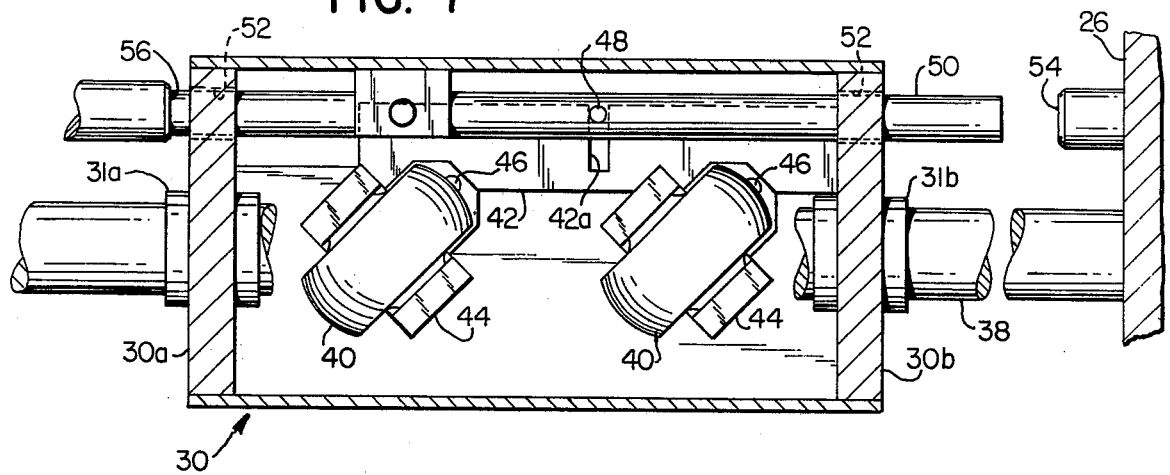
FIG. 7 is a plan view of the carriage illustrated in FIG. 6.

FIG. 7 illustrates the mechanism for shifting the casters 40, 40 from and to the above mentioned positions. Preferably, said means comprises a plate 42 slidably received in the carriage for movement in a direction generally parallel that of the axis of the drive shaft 38, and which plate 42 is pinned to the bifurcated yoke members 44, 44 associated with the casters as indicated generally at 46, 46. The carriage 30 includes upwardly extending side plates 30a and 30b which side plates have means 31a and 31b for rotatably receiving the drive shaft 38. The castered wheels 40, 40 are spring biased upwardly so that their convex peripheries engage the drive shaft 38, and these springs are best shown in FIG. 1 at 41. Thus, the plate 42 and yokes for the castered wheels 44, 44 are constrained to move in a plane parallel to that of the inclined bed 20 and said plane is oriented parallel to the axis of the drive shaft 38. In order to achieve the shifting movement of the castered wheels 40, 40 and of the interconnecting plate 42, a slide member 50 is slidably received in aligned openings 52, 52 in the end plates 30a, 30b of the carriage 30 and it will be apparent from FIG. 7 that ends of the slide member 50 are adapted to abut fixed stops 54 and 56 associated with the opposite ends respectively of the superstructure end plates 26 described above. As illustrated in FIG. 7 the left hand end of the slide 50 is engaging the fixed stop 56 so that the slide 50 is shifted to the right relative to the carriage 30 as the latter reaches its limit of left hand travel in FIG. 7. An upstanding pin 48 in the slide 50 engages a slot 42a in the plate 42 so as to achieve movement of the castered wheels 40, 40 to the position shown for them in FIG. 7. As the carriage 30 reaches its right hand limit of travel the opposite end of the slide 50 engages the fixed stop 54 such that reverse pivotal movement of the wheels 40, 40 will occur about their caster axes. Thus an automatic mode of operation is possible for the carriage 30, and as the carriage reaches its limit of travel at opposite ends of the superstructure described above, the castered wheels 40, 40 will be shifted from the position which drove the carriage to that particular end of the superstructure causing the carriage to stop, and to reverse direction without the necessity for limit switches or the like in order to activate solenoids or other control components such as those described in my prior issued U.S. Pat. No. 3,718,268. Rather, the motor M is adapted to cause reciprocatory motion of the carriage 30 in one and an opposite direction suitable for scoring and breaking the glass tubes and for returning the carriage to its start of cut position at one side of the inclined table 20.

Still with reference to FIG. 6, the carriage 30 moves from the start of cut position toward the left, scoring and breaking the glass tubes T as a result of the staggered positions of the scoring tool 34 and break off shoe 36 in the carriage 30. A lever 60 is pivotally mounted in the carriage 30 as shown at 32, and is spring biased downwardly as a result of the biasing force exerted on the lever 60 by springs (not shown) associated with the adjusting screw 64. A second lever supports break off shoe 36 and has an adjusting screw 66. A third adjusting screw 68 provides a down limit or stop position for these levers to prevent damage to the scoring tool when glass tubes T are not being scored and broken. A lever 70 is pivotally mounted in the carriage 30 and is adapted to being engaged by camming devices located at opposite ends of the superstructure end plates 26 in order to provide for latching of these levers in raised positions for return movement of the carriage. This latching device is released when the carriage has returned to its start of cut position.

As mentioned previously, FIG. 2 shows the bed 20 in its horizontal position and the carriage 30 at its start of cut position but with the scoring tool and break off shoe in their retracted or inactive positions. After the tubes T, T have been placed on the bed 20 the carriage 30 can be operated to square off the starting ends of the tubes T such that the scoring tool 34 engages the upper sides of each of the tubes T, T in turn, and the trailing break off shoe 36 severs these segments so that they drop downwardly into a fixed cull chute 25 mounted in the fixed frame 10 of the machine.

The bed 20 is then raised to its inclined position so that the anvil 32 moves outwardly beyond the edge of the cull chute 25. The measuring bar or stop 22 assumes a measure or stop position and a clamping bar 80 releases the tubes T, T so that the tubes slide downwardly on the bed 20 over the anvil 32 and into engagement with the measuring bar or stop 22. Again, the carriage 30 is provided at its start of cut position and turning next to FIG. 4, the clamping bar 80 again engages the tubes T, T to clamp them against the bed 20 in order to permit a cutting pass of the carriage 30, achieved by the scoring and breaking tools 34 and 36 described above. At the same time the measuring bar stop retracts to an inactive position so as not to interfere with the cutting operation.

Turning next to a detailed description of another important aspect of the present invention, the means for collecting the segments of tubing so cut will now be described. A magazine 90 is movably mounted in the machine frame 10 for receiving these cut tube segments as they drop downwardly and it is an important feature of the present invention that these tube segments drop downwardly no more than an amount approximately equal to the diameter or thickness of the glass tubes being cut.

The magazine 90 includes a lower wall, or floor 92, which floor is adapted to be indexed downwardly in response to successive passes of the carriage in the cutting direction.

Figure 8:
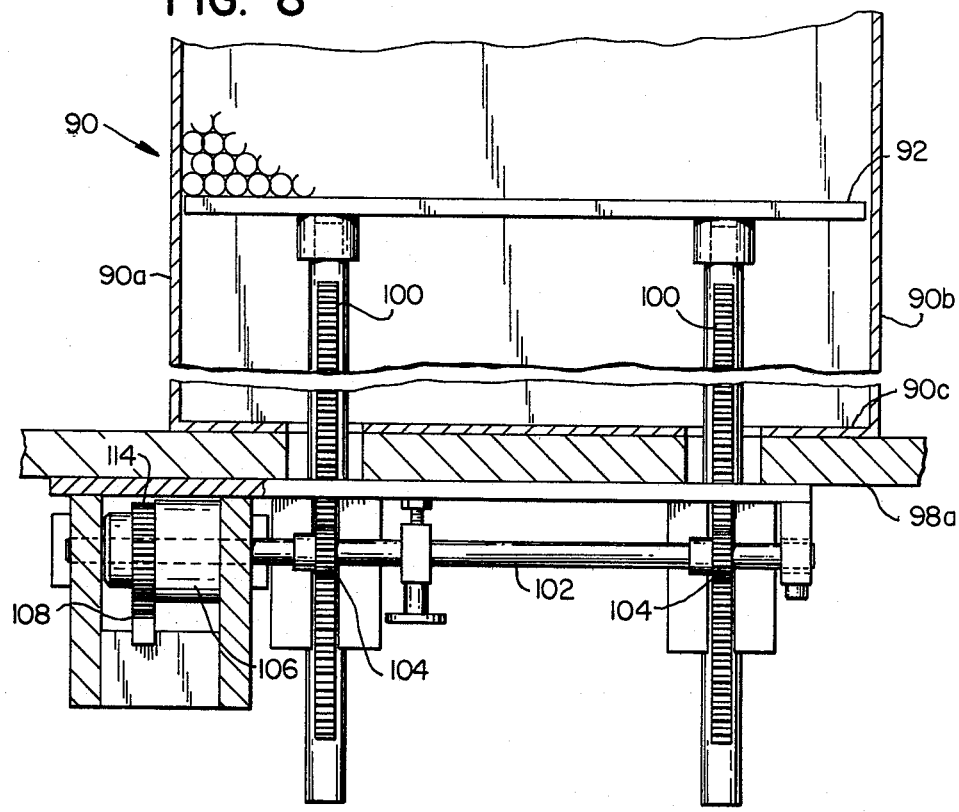
FIG. 8 is an enlarged front view of the magazine illustrated schematically in FIGS. 1-5 inclusively.

Referring more specifically to FIG. 8, the magazine 90 includes spaced front and rear walls supported in fixed relationship to one another by end walls 90a and 90b. The magazine 90 has a bottom wall or floor 92 which is movable, but said magazine 90 also includes a floor 90c which is adapted to support the cut tube segments when the magazine 90 is removed from its position in the machine to be replaced by another magazine 90 which is empty, and can be conveniently mounted over the movable wall 92 in order to permit speedy continued operation of the machine, and to allow for the convenient handling of the cut tube segments in other machines for their further processing, such as burnishing or the like. The lower wall 90c of the magazine 90 has an elongated slot best shown in FIG. 1 for receiving the movable floor 92, which floor comprises the lower wall of the magazine while the magazine is mounted in the machine of the present invention. As mentioned previously this lower wall or floor 92 is indexed downwardly by an amount determined by the diameter of the tubes T, T being cut, and a mechanism for indexing this floor 92 downwardly will now be described.

Referring now to FIG. 1 in greater detail, the fixed frame 10 of the machine includes a pair of laterally spaced guide rails 94, 94 which are cantilever mounted in a bracket 96 provided in the fixed machine frame, and which guide rails 94 slidably support bracket means 98. The bracket means 98 includes a plate 98a for supporting the magazine 90, as best shown in FIG. 8. The indexable lower wall or floor 92 of the magazine 90 is supported on laterally spaced rack gear defining members 100, 100 such that rotation of a cross shaft 102 causes rotation of a pair of pinions 104, 104 which pinions engage these racks, 100 and 100 respectively, so as to achieve the downward movement whereby the floor 92 of the magazine is dropped an amount somewhat less than the diameter of the tubes T, T being cut for each successive pass of the carriage as described above. A one way clutch 106 is coupled to the shaft 102 so that motion of this shaft 102 is achieved in one direction only. The input end of the one way clutch 106 is driven by a short rack gear segment 108 carried by the reciprocating portion of an air cylinder 110. The stroke of the air cylinder 110 is adjustable by means of a stop screw 112 to accommodate different size tubing in the magazine 90. Thus, each time the air cylinder 110 is pulsed it drives rack segment 108 through a stroke dictated by the setting of screw 112, rotating gear 114 through a perdetermined angle, and driving clutch 106 and shaft 102 to drop the floor 92 of the magazine 90. Upon following its return stroke, cylinder 110 has no effect on shaft 102, clutch 106 slipping in this return direction.

Figure 4:
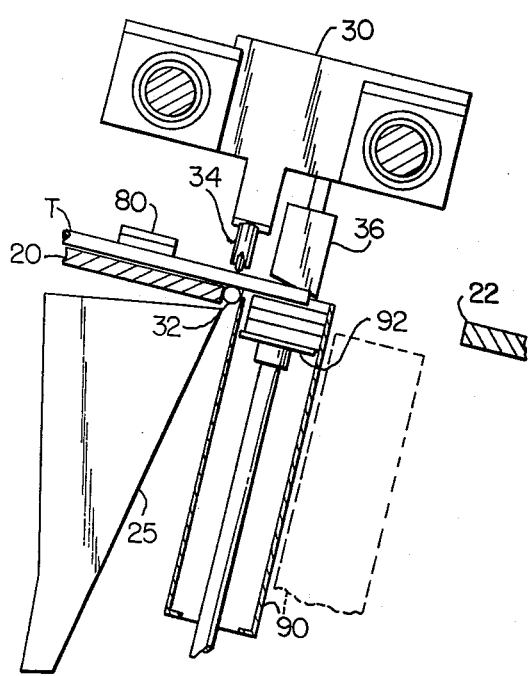
FIG. 4 is a view similar to FIGS. 2 and 3, but illustrating the cutting pass of the carriage with the magazine in position to receive the cut segments.
Figure 5:
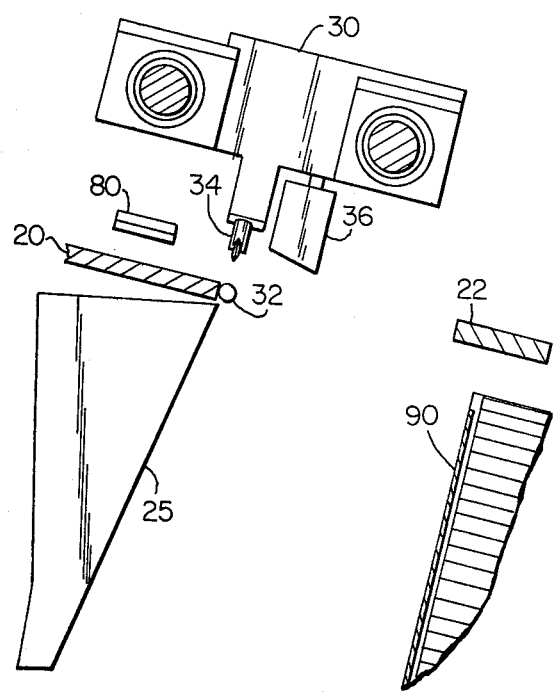
FIG. 5 shows the magazine shifted to its unload position to illustrate the machine configuration after the magazine has been filled, that is when a new magazine must be inserted so as to receive further tube segments as illustrated in FIGS. 1-3.

After a group of tube segments has been cut, the bracket 98 which supports the above described magazine 90 is moved downwardly and toward the right in FIG. 1 on the rods 94, 94 to assume the broken line position shown in FIG. 4. FIG. 1 shows the magazine so positioned, and the actuator 116 for accomplishing this motion. One end of the actuator 116 is pinned to the machine frame 10, and the movable part to the bracket 98. This motion serves to settle or nest the cut tube segments, and to allow the stop or measuring bar 22 to move from its broken to its full line position in FIG. 1. Upon release of the clamping bar 80, through extension of air actuator 120, the tubes T, T are free to slide downwardly against the repositioned stop 22. The tubes can then be reclamped for a subsequent cycle of operation.

These cycles are repeated until the elongated tubes T, T are spent, or until the magazine 90 is filled. In the latter case, the operator removes pin 120 from actuator 116 to slide the bracket 98 and magazine 90 further down the tract 94 for unloading. He simply replaces the filled magazine 90 with an empty one, and resets the floor 92 to its up position for setting up the machine for further automatic or semi-automatic operation. Depending upon the capacity of the magazine used, or the size tubes being cut, the machine could be further automated by providing tandem cylinders in place of the actuator 116 to achieve automatic three position placement of the bracket 98 and hence of the magazine 90. That is, such a tandem actuator would not only have the two position capability of the single actuator 116, but might also be automatically moved to the unload position referred to above, without disconnecting said actuator pin 120 as described above.

I claim:

1. A machine for cutting and storing segments of elongated members such as glass tubing, said machine comprising a fixed frame, a bed for supporting a plurality of these members in side-by-side relation, an anvil adjacent one end of said bed, means mounting said bed to said frame so that said bed is movable between a first position and a position inclined with respect to the horizontal such that the members are adapted to slide on the bed to assume positions wherein these side-by-side members overhang said anvil, stop means provided in spaced parallel relation to said anvil for engaging the overhanging ends of the members to be cut, a carriage having cutting means thereon, means for causing said carriage to traverse said bed in both said first and said inclined positions so that said cutting means moves across the members to cut them, fixed cull chute means for collecting the segments cut when said bed is in said first position, and magazine means for collecting segments when said bed is in its inclined position.

2. A machine for cutting and storing segments of elongated members such as glass tubing, said machine comprising a fixed frame, a bed for supporting a plurality of these members in side-by-side relation, an anvil adjacent one end of said bed, means mounting said bed to said frame so that said bed is inclined with respect to the horizontal and the members are adapted to slide on the bed to assume positions wherein these side-by-side members overhang said anvil, stop means provided in spaced parallel relation to said anvil for engaging the overhanging ends of the members to be cut, a carriage having cutting means thereon, means for causing said carriage to traverse said bed so that said cutting means moves across the members to cut them, and magazine means for collecting the segments so cut, said magazine means being upwardly open and including end walls and spaced front and rear walls separated from one another to accommodate the cut segments therebetween, mounting means for releasably securing said magazine end front and rear walls to said machine frame, said magazine further including a bottom wall which is movable between a raised position adjacent the upwardly open end of said magazine and a lowered position spaced downwardly therefrom, and means for indexing said bottom wall downwardly in response to successive traversals of said carriage and the successive cutting passes of said cutting means.

3. The machine defined by claim 2 wherein said magazine mounting means further includes fixed guide rails in said machine frame, bracket means slidably received on said guide rails, said means for releasably securing said magazine end front and rear walls including said bottom wall indexing means, said means for indexing said bottom wall being permanently provided on said bracket means and including at least one bottom wall support member slidably received in said bracket means.

4. The machine defined by claim 3 wherein said support member of said means for indexing said magazine bottom wall comprises a reciprocating member, means for adjusting the stroke of said reciprocating member to preset the stroke to achieve a desired increment of indexing movement of said bottom wall as it drops downwardly to accommodate each group of cut segments dropping into the upwardly open magazine.

5. The machine defined by claim 4 and further including one way clutch means to permit retraction of said reciprocating member without corresponding movement of said bottom magazine wall.

6. A machine for cutting and storing segments of elongated members such as glass tubing, said machine comprising a fixed frame, a bed for supporting a plurality of these members in side-by-side relation, an anvil adjacent one end of said bed, means for feeding these members along the bed to assume positions wherein these side-by-side members overhang said anvil, stop means provided in spaced parallel relation to said anvil for engaging the overhanging ends of the members to be cut, a carriage having cutting means thereon, means for causing said carriage to traverse said bed so that said cutting means moves across the members to cut them, and means for collecting the segments so cut, said means for causing said carriage to traverse said bed comprises superstructure mounted above said bed and including means defining a guide way for slidably supporting said carriage, said superstructure further including at least one rotatable shaft and means for rotating said shaft in one rotary direction, said carriage further including at least one castered wheel of slightly convex contour continuously rotated by friction in one direction as a result of contact with said unidirectional rotating shaft, and means for moving said castered wheel on its castering axis between limit positions wherein said wheel drives said carriage in one and an opposite direction to cut said members and to return to a start position at one side of the bed.

7. A machine for cutting and storing segments of elongated members such as glass tubing, said machine comprising a fixed frame, a bed for supporting a plurality of these members in side-by-side relation, an anvil adjacent one end of said bed, means mounting said bed to said frame so that said bed is inclined with respect to the horizontal and the members are adapted to slide on the bed to assume positions wherein these side-by-side members overhang said anvil, stop means provided in spaced parallel relation to said anvil for engaging the overhanging ends of the members to be cut, a carriage having cutting means thereon, means for causing said carriage to traverse said bed so that said cutting means moves across the members to cut them, and means for collecting the segments so cut, said means mounting said bed to said machine frame comprises rockshaft means to permit limited tilting movement of said bed from a generally horizontal position to said inclined position at which the elongated members are adapted to slide into overhanging relationship with respect to said anvil.

8. The machine defined by claim 7 wherein said means for causing said carriage to traverse said bed comprises superstructure mounted above said bed and including means defining a guide way for slidably supporting said carriage, said superstructure further including at least one rotatable shaft and means for rotating said shaft in one rotary direction, said carriage further including at least one castered wheel of slightly convex contour continuously rotated by friction in one direction as a result of contact with said unidirectional rotating shaft, and means for moving said castered wheel on its castering axis between limit positions wherein said wheel drives said carriage in one and an opposite direction to cut said members and to return to a start position at one side of the bed.

9. The machine defined by claim 8 further including mounting means for said stop means and means for moving said stop means between a stop position wherein the members engage said stop means and a retracted position wherein said stop means is moved further away from said anvil.

10. The machine defined by claim 8 further including a magazine for collecting the cut segments, and means for mounting said magazine to said frame so that the cut segments drop downwardly no more than an amount approximately equal to their thickness.

11. The machine defined by claim 10 wherein said magazine comprises end walls and spaced front and rear walls separated from one another to accommodate the cut segments therebetween, said magazine further including a bottom wall which is movable between a raised position adjacent the upwardly open end of said magazine and a lowered position spaced downwardly therefrom, said magazine mounting means including means for indexing said bottom wall downwardly in response to successive traversals of said carriage and the successive cutting passes of said cutting means, mounting means for said magazine includes fixed guide rails in said machine frame, bracket means slidably received on said rails, and means for releasably securing said magazine end walls and front and rear walls to said bracket means, said means for indexing said bottom wall being provided on said bracket means and said means for releasably securing said bracket means on said rails comprising actuator means to move said magazine between a position for receiving the cut segments and a retracted position wherein said magazine is at least moved out of the path of movement of said stop means.

12. The machine defined by claim 8 further including means for selectively clamping the elongated members to said bed and for selectively releasing the members for sliding movement along said bed and against said stop means.

* * * * *